Aug. 5, 1947.  H. NAVON  2,425,199
EGG COOKER
Filed Oct. 17, 1945  2 Sheets-Sheet 1
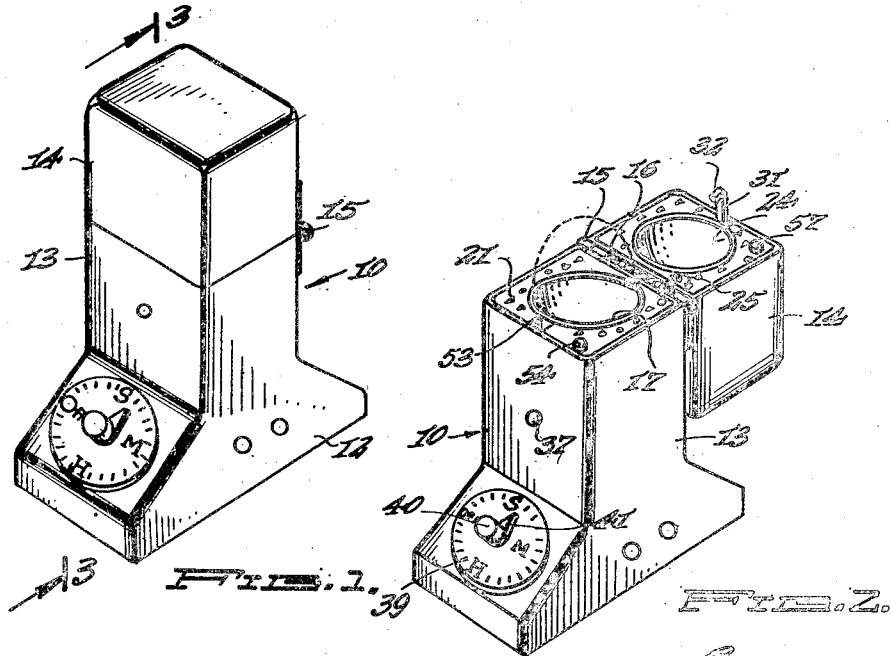
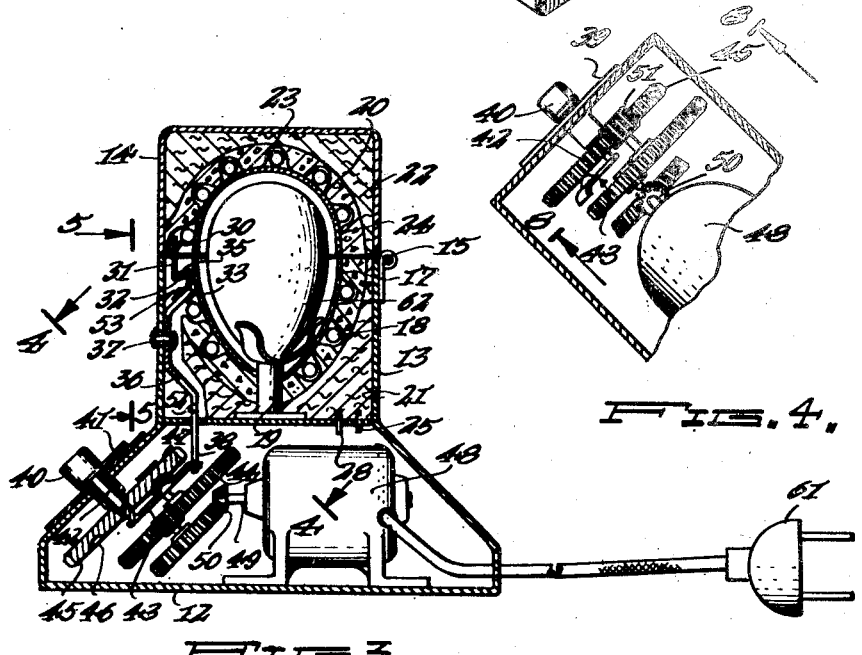
INVENTOR.
HAIMI NAVON.
BY *J. Lodermann*
ATTORNEY.

Aug. 5, 1947.   H. NAVON   2,425,199
EGG COOKER
Filed Oct. 17, 1945   2 Sheets-Sheet 2
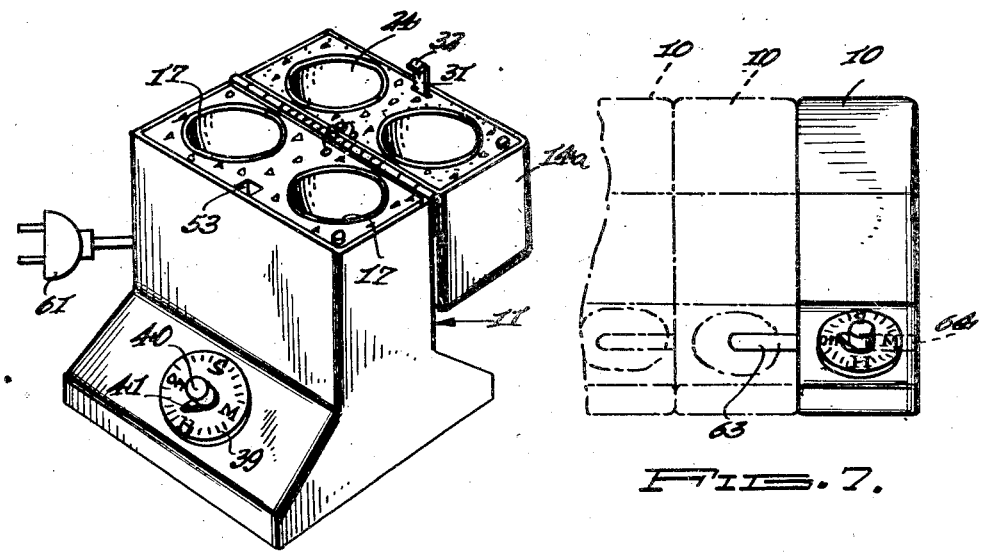
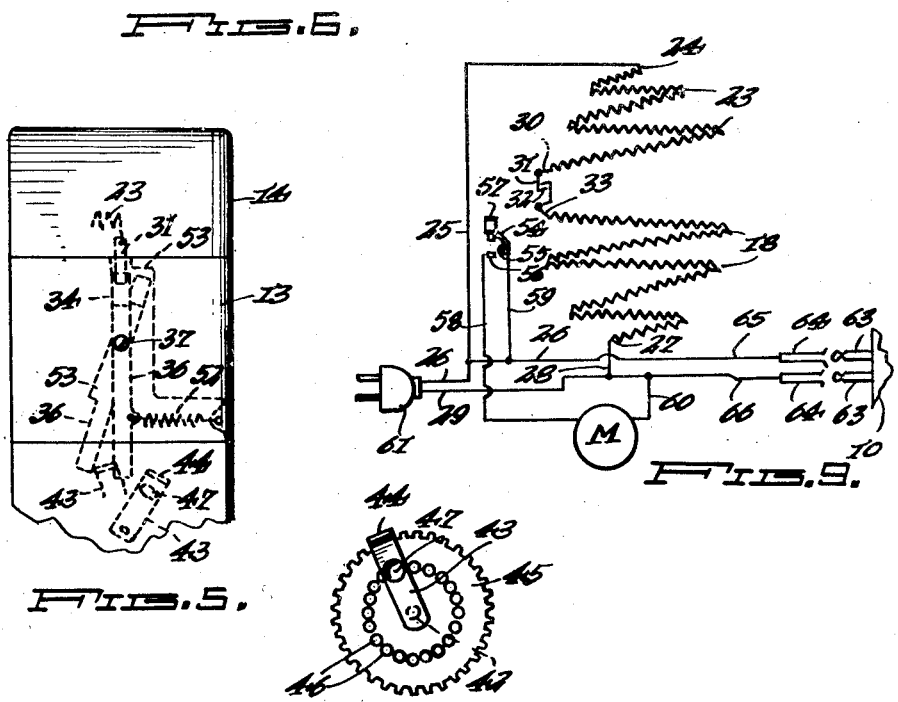
INVENTOR.
HAIMI NAVON
BY J. Ledermann
ATTORNEY.

Patented Aug. 5, 1947

2,425,199

UNITED STATES PATENT OFFICE 2,425,199

EGG COOKER

Haimi Navon, Brooklyn, N. Y.

Application October 17, 1945, Serial No. 622,724

2 Claims. (Cl. 99—440)

This invention relates to egg cookers or boilers, and aims to provide a waterless automatic electric egg cooker wherein one or more eggs may be cooked to the desired degree of hardness with a minimum of trouble and inconvenience and without the need to keep time or watch the cooker during the process.

Another object of the invention is the provision of a time control including a dial on which the desired time or cooking, or the desired degree of hardness, is indicated and adjusted in advance, the electric current through the heating element of the cooker being automatically cut off at the predetermined time, thus assuring that the egg or eggs will in every case be cooked to the desired degree of hardness.

A further object of the invention is the provision of a cover forming part of the cooker together with associated parts or mechanism whereby the cover is released and swung open automatically upon expiration of the predetermined period of time of cooking, thus permitting escape of the heat from the air surrounding the egg and thereby preventing over-cooking of the egg.

The above and other objects will become apparent in the following description, wherein characters of reference refer to like-numbered parts on the accompanying drawings. It is to be noted that the drawings are intended for the purpose of illustration only, and that it is neither intended nor desired to limit the invention necessarily to the specific details of the invention excepting insofar as they may be deemed essential to the invention.

Referring briefly to the drawings,

Fig. 1 is a perspective view of a one-egg cooker embodying the invention.

Fig. 2 is a perspective view of the same with the cover in released or open condition.

Fig. 3 is a cross-sectional view taken on the line 3—3 of Fig. 1.

Fig. 4 is a cross-sectional view taken on the line 4—4 of Fig. 3.

Fig. 5 is a sectional view taken on the line 5—5 of Fig. 3.

Fig. 6 is a perspective view of a multiple egg cooker embodying the invention, with the cover in released or open condition.

Fig. 7 is a fragmentary front elevational view of a battery of the egg cookers illustrated in Fig. 1 or 6, all of which are adapted to function simultaneously, for use where a relatively large number of eggs are to be cooked at the same time.

Fig. 8 is a cross-sectional view taken on the line 8—8 of Fig. 4.

Fig. 9 is a wiring diagram illustrating the electrical connections for the egg cooker.

Referring in detail to the drawings, the numeral 10 indicates a single-egg cooker and the numeral 11 a two-egg or multiple-egg cooker. The cooker 10 comprises a base 12 having a box-like upper structure 13, the latter having a box-like cover 14 secured thereon by a hinge 15 provided with a coiled spring 16 whose function it is normally to urge the cover to swing into the open position shown in Fig. 2.

An approximately semi-ovate shell 17 is supported on the floor of the box 13 by a pedestal 19, and the space between the shell 17 and the box walls and floor is filled with a suitable heat-resisting material 21, of which rock wool may be cited as one example. A complementary approximately semi-ovate shell 20 is also mounted inside the cover 14, and is held in position and separated from the walls of the cover by a similar heat-resisting material 22. The coils 18 of an electric resistance constituting a heating element, are positioned in series around the lower shell 17; likewise, the coils 23 of a similar heating element are positioned in series around the upper shell 20. One end 24 of the upper series of coils 23 is led by a lead 25 into contact with one of the incoming feed wires, 26; likewise, one end of the lower series of coils 18, shown at 27, is led by a lead wire 28 into contact with the feed wire 29.

The other end 30 of the upper series of coils 23 is attached to a resilient tongue 31 imbedded in and projecting downward from the cover 14 and provided with a deformed lip 32. Also, the other end 33 of the lower series of coils 18 is attached to a complementary tongue 34 having a projecting lip 35 adapted to slide over and then snap back into the locking position shown in Fig. 3, the lip 32 of the tongue 31, both tongues 31 and 34 yielding backwards during this operation. The tongue 34 is in turn mounted on the upper end of a pivoted lever 36, pivoted at 37 in the front wall of the box 13.

The lever 36 projects downward through the floor of the box 13. A dial 39 is mounted against a wall of the base 12, which may be graduated, as desired, for instance, into quadrants indicated by letters "S" for "soft boiled," "M" for "medium hard boiled," "H" for "hard boiled" and "0" or zero when the cooker is out of use. Any other scheme of graduations may of course be used. A knob 40 has an indicator 41 thereon and is provided with a pivot stem 42 projecting through the base housing; a resilient finger 43 is secured on the end of the stem 42 at right angles thereto. The lower end 38 of the lever 36 lies in the orbit of the free extremity 44 of the finger 43.

Rotatably mounted on the stem 42 is a gear 45 having arranged in a circle on the underside thereof a plurality of spaced indentations 46. The finger 43 is provided at the back with a raised boss 47 adapted to register in any one of the circle of indentations 46, and the resiliency of the finger normally urges the boss 47 against the gear and hence to register in any indentation 46 which falls directly thereunder. A motor 48 is mounted in the base 12, and may be of any suitable type of small electric motor, such as, for instance, a telechron motor of the kind used in electric clocks. The shaft 49 of the motor is provided with a bevel gear 50 which, through the medium of a train of reduction gears and pinions actuates the pinion 51 which is in mesh with the gear 45.

The lever 36 may be made of any suitable insulating material such as, for instance, hard rubber, or metal with a hard rubber coating, not shown. A spring 52 is anchored in the housing of the box 13 and secured to the lower portion of the lever 36. It is to be noted that a compartment 53 is formed in the box 13, free of insulating material 21, for the mounting of the lever 36 and its associated parts. The side walls of this compartment thus serve as limit stops to the movement of the upper end of the lever 36, as shown in Fig. 5. The spring 52 obviously normally urges the lever 36 to carry its upper end against the left-hand wall (Fig. 5) of this compartment, that is, with the lever in upright position, in interlocking engagement with, or adapted to interlock with, the tongue 32 of the cover 14. It is to be noted, also, that the indicator 41 and the finger 43 are both parallel with each other, that is, they lie in the same plane through the axis of the stem 42, and hence they move together as the knob 40 is turned.

A simple push button switch is provided for closing the circuit through the motor 48 when the cover is closed, and reopening it when the cover is released. This switch comprises the button 54 slidably mounted in and projecting slightly upward from the top of the mass of insulating material, or, in other words, from the top of the box 13, and supported on a contact spring finger 55 normally held by the spring a slight distance above a fixed contact 56. A boss 57 mounted in and projecting from the cover 14 is adapted, upon closing the cover down, to push the button 54 down to close contact between the switch parts 55—56, thereby closing the circuit through the motor 48 through the leads 58, 59, and 60 as is apparent in the wiring diagram of Fig. 9.

When the knob 40 is turned to move the indicator 41 from the "0" or starting position to any other position of the dial, the finger 43 will follow, slipping across the gear 45 and clicking as the boss 43 falls into successive recesses 46. Assuming that the dial is set at any position other than zero, such as, say the "M" position, with the feed plug 61 in its power socket, not shown, closing the cover causes interlocking of the tongues 31 and 34 as above described, and simultaneously closes the switch button and the circuit through the motor, starting the latter. The train of gears between the motor and the gear 45 causes the latter to rotate in a counter-clockwise direction (Fig. 2), that is, in a clockwise direction with respect to the dial (Fig. 8). When the gear 45 has been rotated through a sufficient arc to bring the finger 43 with it to contact the lever 36, continued rotation of the gear will cause the finger gradually to move the lever until the tongue lips 35 and 32 are freed of each other, thus permitting the hinge spring 16 to lift the cover back, breaking the contact through the coils and simultaneously opening the motor circuit and bringing the motor to a stop. The lifting of the cover out of the way to permit the trapped heat to escape thus bring an immediate cessation of the cooking of the egg so that hardening beyond the degree set on the dial is avoided. It is to be noted that the gear 45 rotates the indicator 41 and the finger 43 from the position originally set on the dial, such as the "M" position mentioned, back to the zero or starting position during the cooking of the egg, and it is when the finger 43 reaches the latter position that the lever 36 has been swung a sufficient distance to release its tongue lip 35 from the cover tongue lip 32. Thus, the cooker is always in readiness to be used again, and in doing so the dial is first set to the desired position, such as "M," the egg placed inside, and the cover clamped down, and immediately the cover is down the cooking starts. The egg is indicated at 62 in Fig. 3.

The double-egg cooker shown in Fig. 6 is substantially of identical construction with the exception that each housing 11 will contain a pair of shells 17—24 between the body and the cover thereof, and both sets of heating element coils therefor, not shown, would be connected in parallel, and but one dial 39 would serve to control the synchronous cooking of both eggs.

In Fig. 7 is illustrated, solely by way of an example, how any number of cookers 10 (or 11) may be constructed and hooked up in multiple to provide a battery of cookers, each having its own dial control, for use when it is desired to cook a larger number of eggs at one time. For this purpose, each cooker 10 would be provided on one side with a pair of male contact prongs 63 and the other side with a pair of female contact sockets 64, so that the prongs of one unit may be inserted into the sockets of the next adjacent unit. This is illustrated to some extent in Fig. 9, showing the leads 65, 66 which as continuations of leads 26, 29 respectively, terminating in socket contacts 64, and adjacent thereto the prong contacts 63 of the next adjacent unit 10 adapted to be hooked up thereto in the manner described.

As set forth above, the cooker of this invention is entirely fool-proof and automatic in cooking eggs to the desired degree of hardness, or for the desired period of time, and no watching is required on the part of the operator. The eggs are properly cooked as desired even if nobdy is present to remove them after they are cooked, as with the cover automatically lifted out of the way the eggs will immediately begin to cool with no possibility of receiving further cooking, as is the case when the heat is turned off under a pan of water in which eggs have been cooked.

Obviously, modifications in form and structure may be made without departing from the spirit and scope of the invention.

I claim:

1. An egg cooker comprising a body having a cover hinged thereto and provided with means normally urging said cover to swing into open position, interlocking means partly on said cover and partly on said body for releasably locking said cover in closed position against said body upon swinging said cover from said open to closed position, a lever normally in substantially upright position pivoted intermediate its length and provided with means normally maintaining the lever in said upright position, said interlocking means on said body being fixed on the upper end of said lever, a dial on said body having a stem rotatably mounted therein, a knob on said stem adjacent said dial, said stem having a finger at right angles thereto on the end thereof behind said dial, a gear rotatably mounted on said stem between said dial and said finger, said gear having a plurality of recesses arranged in a circle on that face thereof adjacent said finger, said finger having a boss thereon and being resilient thereby urging said boss against said face of said gear and to register in any one of said recesses, the lower end of said lever lying in the orbit of the extremity of said finger, motive means for turning said gear in one direction, said gear being adapted to be turned in the opposite direction to a predetermined arcuate position from the starting or zero point on said dial by said knob, said gear upon rotation thereof by said motive means through said predetermined arc carrying said finger therewith and at the end of said arc of travel swinging said lever about its pivot to disengage the said interlocking means on said body thereon from said interlocking means on said cover to release said cover.

2. The egg cooker set forth in claim 1, said interlocking means partly on said cover and partly on said body comprising said cover having a tongue projecting therefrom, said tongue having a lip thereon, said body having a complementary tongue and a complementary lip on said body tongue of resilent material adapted to interlock with said first-named tongue and lip.

HAIMI NAVON.

REFERENCES CITED

The following references are of record in the file of this patent:

UNITED STATES PATENTS

| Number | Name | Date |
| --- | --- | --- |
| 865,527 | Radtke | Sept. 10, 1907 |
| 1,865,973 | Shields | July 5, 1932 |
| 2,057,741 | Purpura | Oct. 20, 1936 |
| 2,226,035 | Watson | Dec. 24, 1940 |
| 1,767,802 | Langos | June 24, 1930 |
| 1,656,662 | Carter et al. | Jan. 17, 1928 |
| 1,790,083 | Armstrong | Jan. 27, 1931 |